E. S. WOODS.
SIDE BEARING FOR CARS.
APPLICATION FILED NOV. 2, 1908.
Reissued Dec. 6, 1910.
13,181.
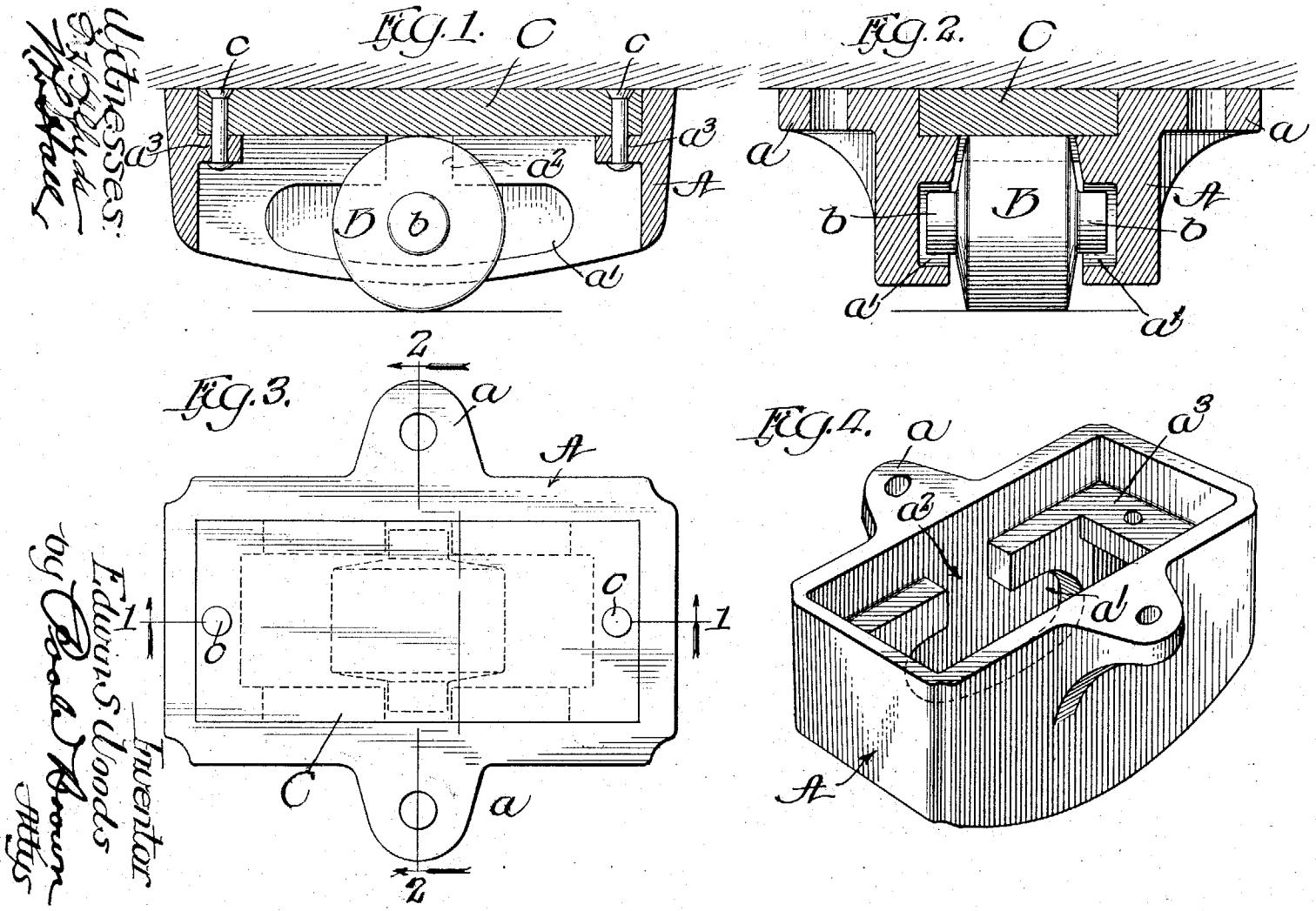

UNITED STATES PATENT OFFICE.

EDWIN S. WOODS, OF CHICAGO, ILLINOIS.

SIDE BEARING FOR CARS.

13,181. Specification of Reissued Letters Patent. Reissued Dec. 6, 1910.

Original No. 860,177, dated July 16, 1907, Serial No. 190,823. Reissue No. 12,689, dated August 27, 1907.
Application for reissue filed November 2, 1908. Serial No. 460,797.

*To all whom it may concern:*

Be it known that I, EDWIN S. WOODS, a citizen of the United States, and a resident of Chicago, in the county of Cook and State of Illinois, have invented certain new and useful Improvements in Side Bearings for Cars; and I do hereby declare that the following is a full, clear, and exact description thereof, reference being had to the accompanying drawings, and to the letters of reference marked thereon, which form a part of this specification.

My invention relates to certain new and useful improvements in antifriction bearings, as side bearings for cars and other purposes, and its object is to produce a device of this class which shall have certain advantages which will appear more fully and at large in the course of this specification.

To this end, my invention consists in certain novel features of construction which are clearly illustrated in the accompanying drawings and described in this specification.

In the aforesaid drawings, Figure 1 is a central longitudinal section through one of my improved side bearings, the line of section being indicated at 1—1 of Fig. 3. Fig. 2 is a transverse section in the line 2—2 of Fig. 3, looking in the direction of the arrow. Fig. 3 is a plan view; and Fig. 4 is a perspective view of the main portion of the side bearing box.

Referring to the drawings, A is the main portion of the bearing box or carrier, and its form will be readily understood from the illustrations thereof. It will be seen that this box is rectangular in shape, open at top and bottom, and may be provided with laterally extending perforated ears $a$, as shown in the drawing, by which it can be secured to the body supporting member of the car or other structure. The lower portion of the box is preferably curved. The sides of the box are channeled out at $a^1$, these channels running longitudinally of the box, and having upward extensions $a^2$ at the center. The bottoms of the channels $a^1$, constituting tracks or flanges, it will be seen, slope down slightly toward their centers, the purpose of which will be presently apparent.

B indicates a suitable roller or antifriction device which has laterally extending gudgeons $b$. In assembling the bearing, the roller B is passed into the box, through the upper side, the laterally extending gudgeons of the roller B passing down through the upwardly extending portions of the channels at $a^2$ and resting on the bottom portions or tracks of the channels $a^1$, which are to guide the movement of the roller at certain times. The upper side of the box or carrier may be countersunk to receive a cover or wear plate C, which may be secured in place by rivets $c$ which pass through flanges $a^3$ formed upon the end walls of the box, as herein illustrated. The box or carrier fits against the part to which it is attached in such manner that the wear plate or cover will be held in place between said part and the carrier whether the rivets $c$ be present or not; but the rivets hold the parts assembled for purposes of shipment. The bottom side of the cover thus affords a track or tread for the roller at the upper side of the box. The cover or wear plate C also serves to confine the roller in the box, it being apparent from the drawing that a portion of the wear plate bears such relation to the roller and to the notches or extensions through which the gudgeons pass when the roller is being inserted into or removed from the box that the roller can not be removed and is therefore locked in the carrier when the cover or wear plate is in place, but is free to be removed when the wear plate is removed. The said cover or wear plate is so arranged that it may be reversed so that when the lower side thereof is worn by engagement with the roller it may be turned over or reversed to present a new tread surface to the roller.

The operation of this device will be readily apparent. The bearing is secured in place on the body bolster or other part which carries the same, as are bearings of the same general construction, and when any weight is placed upon the bearing, the roller contacts with the cover C and rolls back and forth thereon. When, for any reason, the bearing is raised, and the roller happens to be off the center of the bearing box, it rolls down to the center of the channel $a^1$, that is, to the lower portion of the same.

I realize that considerable variation is possible in the details of this construction without departing from the spirit of the invention, and I therefore do not intend to limit myself to the specific form herein shown and described, except as hereinafter made the subject of specific claims.

I claim as my invention:—

1. In an antifriction bearing, the combination with an open top casing adapted to be secured to a bolster, an antifriction device carried by said casing, and a member removable from said casing, located in position to serve as a tread for the antifriction device and to retain the same from displacement from said casing, said member forming a cover for said casing.

2. In a roller bearing, a casing provided with an elongated roller chamber, a roller removably mounted in said chamber and provided with trunnions, flanges on the side walls of the casing adapted for engagement by said trunnions, and a wear plate removably fitted within said chamber and arranged to confine said roller in said chamber.

3. In a roller bearing, a casing provided with an elongated roller chamber, a roller removably mounted in said chamber and provided with trunnions, flanges on the side walls of the casing adapted for engagement by said trunnions, a wear plate removably fitted within said chamber and arranged to confine the roller in the chamber, and means for locking the wear-plate in place.

4. In a roller bearing, a chambered casing, a roller removably mounted therein provided at its ends with trunnions, said casing being provided with an opening to receive the roller and with notches at the sides of the opening through which the trunnions of the roller pass when the roller is inserted into and removed from the casing, flanges on the side walls of the casing adapted for engagement by said trunnions, and a wear plate removably fitted in said casing and constructed and arranged to confine the roller in the casing.

5. In a roller bearing, a chambered casing, a roller removably mounted therein provided at its ends with trunnions, said casing being provided with an opening to receive the roller and with notches at the sides of the opening through which the trunnions of the roller pass when the roller is inserted into and removed from the casing, flanges on the side walls of the casing adapted for engagement by said trunnions, and a wear plate removably fitted within said casing and having a part so disposed relatively to said notches as to prevent the trunnions from passing through the notches when the wear plate is in place.

6. In a roller bearing, an integral casing provided with an elongated roller chamber, a roller removably mounted in said chamber and provided with trunnions, flanges on the side walls of the casing adapted for engagement by said trunnions, a wear plate removably fitted within said chamber, and arranged to confine said roller in said chamber.

7. In a roller bearing, an integral casing provided with an elongated roller chamber, a roller removably mounted in said chamber and provided with trunnions, flanges on the side walls of the casing adapted for engagement by said trunnions, a wear plate removably fitted within said chamber, and arranged to confine the roller in the chamber, and means for locking the wear plate in place.

8. In a roller bearing, a chambered integral casing, a roller removably mounted therein provided at its ends with trunnions, said casing being provided with an opening to receive the roller and with notches at the sides of the opening through which the trunnions of the roller pass when the roller is inserted into and removed from the casing, flanges on the side walls of the casing adapted for engagement by said trunnions, and a wear plate removably fitted in said casing and constructed and arranged to confine the roller in the casing.

9. In a roller bearing, a chambered integral casing, a roller removably mounted therein provided at its ends with trunnions, said casing being provided with an opening to receive the roller and with notches at the sides of the opening through which the trunnions of the roller pass when the roller is inserted into and removed from the casing, flanges on the side walls of the casing adapted for engagement by said trunnions, and a wear plate removably fitted within said casing and having a part so disposed relatively to said notches as to prevent the trunnions from passing through the notches when the wear plate is in place.

10. A side bearing for railway cars comprising a casing or shell which has openings in its top and bottom and a roller in said shell adapted for rolling contact, through said openings, with bearing surfaces; said casing or shell being provided with tracks located in position to support the roller when the latter is below and free from the upper bearing surface and the said roller having free movement in the shell both endwise of the latter and vertically with respect to said tracks.

11. A side bearing for railway cars comprising a casing or shell which has openings in its top and bottom and a roller in said shell adapted for rolling contact, through said openings, with bearing surfaces and provided with trunnions at its ends; said casing or shell having inwardly extending flanges forming tracks which are located in position to engage the said trunnions when the roller is below and free from the upper bearing surface and the said roller having free movement in the shell both endwise of the latter and vertically with respect to the said tracks.

12. A side bearing for railway cars comprising an upper bearing plate, an open-topped casing or shell made separate from said bearing plate, and a roller in said shell provided with trunnions at its ends; said shell having on its side walls tracks adapted to engage the trunnions when the roller is out of contact with the bearing plate and said shell and bearing plate having interfitting parts at their meeting margins, adapted to rigidly hold the bearing plate and shell from relative lateral movement.

13. In a device of the class described, the combination with a suitable roller having oppositely extending gudgeons, of a box open at its top to receive the roller, and having a longitudinally slotted bottom, through which the roller projects, there being inwardly extending side flanges on the box, to limit the downward movement of the roller, and a cover for the box separately formed and adapted to furnish an upper tread for the roller.

14. In a device of the class described, the combination with a suitable roller having oppositely extending gudgeons, of a box open at its top to receive the roller, and having a longitudinally slotted bottom, through which the roller extends, there being horizontal channels in the side walls, and upwardly extending channels communicating therewith through which the gudgeons pass in assembling the structure, and a cover for the box, separately formed and adapted to furnish an upper tread for the roller.

15. In a side bearing, the combination with a casing open at the top and having a longitudinally slotted bottom and inwardly extending side flanges, of an antifriction device adapted to be inserted into said casing through the open top and project through the slotted bottom thereof, and provided with oppositely extending gudgeons adapted to engage said side flanges, and a separately formed plate adapted to be secured to said casing to form an upper tread for said antifriction device.

16. In a device of the class described, the combination with an antifriction device having oppositely extending gudgeons, of a box open at the top to receive said antifriction device and having a longitudinally slotted bottom through which said antifriction device projects, inwardly extending side flanges on said box to limit the downward movement of said antifriction device, and a cover for said box separately formed and adapted to furnish an upper tread for said antifriction device.

17. In an antifriction bearing, in combination with a bolster, a carrier secured to said bolster, an antifriction device supported by said carrier, a member removable from said carrier and located in position to serve as a tread for said antifriction device and to retain the same against displacement from the carrier, and means for rigidly locking said member in place when said carrier is secured to said bolster.

18. In an antifriction bearing, the combination with a carrier supporting an antifriction device, of a member provided with tread surfaces on its opposite sides, said member being removably carried by the carrier in position to serve as a tread for the antifriction device and retain the same against displacement from the carrier and arranged to be reversed to present either of two opposite sides to the antifriction device.

In testimony, that I claim the foregoing as my invention I affix my signature in the presence of two witnesses, this 29th day of October A. D. 1908.

EDWIN S. WOODS.

Witnesses:
WILLIAM L. HALL,
G. J. BRYCE.